(12) United States Patent
Hines et al.

(10) Patent No.: US 6,571,638 B2
(45) Date of Patent: Jun. 3, 2003

(54) SURFACE-ACOUSTIC-WAVE PRESSURE SENSOR AND ASSOCIATED METHODS

(75) Inventors: Jacqueline Hines, Annapolis, MD (US); Charles Carpenter, Orlando, FL (US); Leland P. Solie, Apopka, FL (US)

(73) Assignee: Sawtek, Inc., Orlando, FL (US)

( * ) Notice: Subject to any disclaimer, the term of this patent is extended or adjusted under 35 U.S.C. 154(b) by 0 days.

(21) Appl. No.: 09/895,873

(22) Filed: Jun. 29, 2001

(65) Prior Publication Data

US 2002/0078757 A1 Jun. 27, 2002

Related U.S. Application Data

(60) Provisional application No. 60/215,614, filed on Jun. 30, 2000.

(51) Int. Cl.$^7$ .............................................. G01L 11/00
(52) U.S. Cl. ...................................................... 73/702
(58) Field of Search .................... 73/702, 703, 727, 73/754; 428/458; 333/193, 195; 310/313; 374/117, 118, 119, 143

(56) References Cited

U.S. PATENT DOCUMENTS

| | | | | |
|---|---|---|---|---|
| 4,382,386 A | * | 5/1983 | Coussot et al. | 73/708 |
| 6,003,378 A | * | 12/1999 | Scherr et al. | 73/703 |
| 6,137,708 A | * | 10/2000 | Lin et al. | 365/51 |

OTHER PUBLICATIONS

Donald Krantz, John Belk, Paul J. Biermann, Joel Dubow, Lee W. Gause, Ramesh Harjani, Susan Mantell, Dennis Polla, Philip Troyk; "Applied Research on Remotely–Queried Embedded Microsensors"; SPIE conference on Smart Electronics and MEMS, Newport Beach, CA; pp. 157–164, Mar. 1999.

Charles Hautamaki, Shayne Zurn, Susan C. Mantell, Dennis L. Polla; "Embedded Microelectromechanical Systems (MEMS) for Measuring Strain in Composites"; Journal of Reinforced Plastics and Composites, vol. 19, No. pp. 268–277; Apr. 2000.

Hareesh Subramanian, Vijay K. Varadan, Vasundara V. Varadan, M.J. Vellekoop; "Design and Fabrication of Wireless Remotely Readable MEMS Based Microaccelerometers"; pp. 730–738; Oct. 03, 1997.

Siew–Lok Toh, Cho–Jui Tay, Sum–Huan Ng, Mustafizur Rahman; "$Al_xGa_{1-x}As$ Semiconductor Sensor For Contact Pressure Measurement"; Elsevier Science S.A.; pp. 31–35; Oct. 29, 1998.

Frank D. Bannon, III, John R Clark, Clark T.–C Nguyen; "High–Q HF Microelectromechanical Filters"; Journal of Solid–State Circuits, vol. 35. No. 4; pp. 512–526; Apr. 2000.

Clark T.C Nguyen; "Frequency–Selective MEMS for Miniaturized Low–Power Communication Devices"; Transactions On Microwave Theory and Techniques, vol. 47, No. 8, pp. 1436–1503; Aug. 1999.

(List continued on next page.)

*Primary Examiner*—Hezron Williams
*Assistant Examiner*—Marissa Ferguson
(74) *Attorney, Agent, or Firm*—Allen, Dyer, Doppelt, Milbrath & Gilchrist, P.A.

(57) ABSTRACT

A pressure and temperature sensor includes a sealed insulating package and an elastic, piezoelectric substrate deformably supported within the package. At least three surface-acoustic-wave resonators are affixed to a bottom of the substrate. A first and a second resonator are positioned in parallel relation along the substrate. A third resonator has a long axis nonparallel to the long axes of the first and the second resonator. The temperature coefficients of the first and second resonators are substantially equivalent; that of the third is different from those of the first and the second resonator, for permitting a temperature change to be sensed. Electrical connectors extend between the resonators to the outside of the package. A sensing system also includes an antenna for sending and receiving electromagnetic signals to and from the device.

16 Claims, 4 Drawing Sheets

OTHER PUBLICATIONS

Sue Ambrose, Carol Nelson; Sensorsmag.com.; "The Flexible Silicon Strain Gauge From BF Goodrich Advanced Micro Machines Wins Grand Prize At The Best Of Sensors Expo Awards"; pp. 1–3; Oct. 2000.

W. Buff, M. Rusko, M. Goroll, J. Ehrenpfordt, T. Vandahl; "Universal Pressure and Temperature SAW Sensor for Wireless Applications"; Ultrasonics Symposium; pp. 359–362; Aug. 1997.

L. Reindl, C.C.W. Ruppel, K. Riek, T. Pankratz, R. Weigel; "A Wireless AQP Pressure Sensor Using Chirped SAW Delay Lines Structures"; Ultrasonics Symposium; pp. 355–358; Jul. 1998.

NewsDesk 0037; wysiwyg://casa,newsdesk_contents.contents...press/newsdesk_archive/2000/e_0037_dhtml; "Video Material On the Cleaning Robot"; Oct. 2000.

NewsDesk 0037 wysiwyg://casa,newsdesk_contents.contents...press/newsdesk_archive/2000/e_0037_dhtml; "Magic Sensor Suitable For Bells, Remote Controls, Light Switches, Door Openers and Much More"; Oct. 2000.

K.I. Arshak, D. McDonagh, M.A. Durcan; "Development of New Capacitive Strain Sensors Based on Thick Film Polymer and Cerment Technologies"; Elsevier Science S.A.; pp. 102–114; Aug. 13, 1999.

R. Steindle, A. Pohl, L. Reindl, F. Seifert; "SAW Delay Lines For Wirelessly Requestable Conventional Sensors"; Ultrasonics Symposium, pp. 351–354; Jul. 1998.

Alfred Pohl, Reinhard Steindl, Leonhard Reindl, Franz Seifert; "Wirelessly Interrogable Sensors For Different Purposes In Industrial Radio Channels"; Ultrasonics Symposium; pp. 347–350; Jul. 1998.

Eric Udd; "Advanced Strain Measurement Using Fiber Optic Grating Sensors For Civil Structure Applications"; Blue Road Research; pp. 969–973.

* cited by examiner

SURFACE-ACOUSTIC-WAVE PRESSURE SENSOR AND ASSOCIATED METHODS

CROSS-REFERENCE TO RELATED APPLICATION

This application claims priority from co-owned and co-pending provisional application 60/215,614, filed Jun. 30, 2000, entitled "SAW Pressure Sensor."

FIELD OF THE INVENTION

The present invention relates generally to pressure sensing devices, and more particularly to a pressure sensor device and methods employing surface-launched acoustic wave devices, a method of use thereof, and a manufacturing method therefor. Additionally, the present invention relates to wirelessly interrogable pressure sensing devices.

BACKGROUND OF THE INVENTION

In recent years, surface-launched acoustic wave sensors, and specifically surface acoustic wave (SAW) sensors, have gained significant recognition as tools for measuring physical and chemical parameters in a wide variety of applications. SAW sensor technology offers the following general advantages: passive device operation (no battery); potential for use as a sensor and an RF transmitter when queried, providing wireless operation; small size, low cost, rugged construction, and ease of production in high volume using standard process equipment. Some of the physical parameters measured using SAW sensors include temperature, pressure, strain, acceleration, and torque.

Numerous potential applications have been mentioned in the literature for such sensors, one of which is the measurement of the pressure and/or temperature within tires. Tire pressure sensors using SAW devices have been demonstrated in the technical literature. Temperature sensors have also been demonstrated using SAW devices. Additionally, at least one patent has been issued relating to the use of SAW devices as sensors for tire pressure (U.S. Pat. No. 6,003,378 to Siemens).

However, each of the approaches to tire pressure sensing using SAW devices known in the art is lacking in some way. Primarily, these approaches are difficult to manufacture and package in high volume, and thus would be prohibitively expensive for the desired application. Further, the known devices are believed to be too large to be practicable over a long time within a tire, which is an environment subject to extremes of temperature and forces. Additionally, many of the known approaches are not temperature compensated, which results in inaccuracies in measurements due to variations in temperature. A brief description of two of the most relevant prior art examples is necessary to demonstrate the advantages of the present invention.

One approach to sensing strain using SAW devices has been to fabricate SAW devices on both sides of a piezoelectric substrate that is supported at one end, as in a cantilevered beam. Bending of this beam then results in one side undergoing compression while the other side undergoes expansion. The compressed side experiences an increase in SAW velocity and thus frequency (or a reduction in delay), while the expanded side experiences a decrease in SAW velocity and a corresponding reduction in SAW frequency (or an increase in delay)

The double-sided approach has the distinct advantage of being inherently temperature compensated, since any fluctuation in temperature would have a uniform effect on the piece of piezoelectric substrate, and would result in the same change in SAW velocity due to temperature in both devices. This concept can easily be extended to a multiply supported membrane, with one side sealed to a reference chamber. In this configuration, the device becomes a pressure sensor. The reference chamber can be filled with a desired pressure (from vacuum to a desired set pressure), and as long as this reference chamber is hermetically sealed to the piezoelectric substrate, it provides a stable reference pressure for comparison. The piezoelectric membrane would then deform in response to changes in external pressure, causing complementary changes in frequency or delay of the SAW devices on either side of the membrane.

Practical difficulties arise, however, when considering how to manufacture and package such devices. Fabricating SAW device on two sides of a wafer, while possible, is considerably more complicated than the standard single-sided fabrication processes known and used in the art. Additionally, the surface of the SAW device must be protected from contamination, while still being exposed to the pressure to be measured, because contaminants that adsorb onto the surface would cause changes in the SAW performance that would confound the measurements being made. Protecting the surface of the SAW without reducing the sensitivity of the device is a difficult problem, and one for which an adequate solution has not (to Applicants' knowledge) been found. Finally, making electrical connections to this double-sided device and connecting the device to an antenna for wireless interrogation are quite challenging tasks.

U.S. Pat. No. 6,003,378 to Scherr et al. teaches a wirelessly interrogable pressure sensor using SAW elements wherein a reflective delay line with at least three reflectors is positioned on a pressure sensing membrane such that it extends over both an expanding and a compressing region of the membrane. When subjected to a change in pressure, the reflectors located in regions of compression and expansion undergo shifts in acoustic wave velocity and hence in the phase angle of the reflected signal. Such shifts in phase angle can be measured and provide information on the pressure change that has occurred. Plate bending is used in this device, requiring a much larger device than would otherwise be needed in order to achieve the desired complementary stress distributions within the substrate. In this and other publications based on this work, the device is described as having the piezoelectric substrate of the SAW device as the pressure sensing membrane, packaged using an AQP (all-quartz package) approach. This involves joining two quartz plates together using some mechanical support and adhesive joint material such as a glass frit seal. This process is not compatible with conventional SAW device packaging and manufacturing techniques, and results in a device that, while responsive to pressure, is relatively fragile, is expensive to produce, and cannot be used to measure temperature.

Based on the foregoing descriptions, the main drawbacks to the known prior art technology are:

1. Devices are not manufacturable in high volume.
2. Final devices are not as rugged or robust as necessary for applications in harsh environments.
3. Device sizes are larger than desired.
4. Devices are more expensive to produce than desired, requiring nonstandard manufacturing techniques.
5. Some devices are not temperature compensated.
6. Double-sided sensor devices would be difficult to package without causing a reduction in sensitivity.
7. Known devices that can provide both pressure and temperature measurement are impracticably and impractically large.

SUMMARY OF THE INVENTION

It is therefore an object of the present invention to provide a wirelessly interrogable SAW-based sensor.

It is a further object to provide such a sensor that is capable of meeting the rigorous challenges encountered within such environments as the interior of a tire and during tire manufacturing process.

It is another object to provide such a sensor that is capable of producing a sensitive, temperature-compensated pressure measurement.

It is an additional object to provide such a sensor that provides temperature information in addition to the pressure measurement.

It is also an object to provide such a sensor that is manufacturable using known, relatively standard techniques.

It is yet a further object to provide such a sensor that can be produced in high volumes and at low cost.

It is yet another object to provide a sensing system using such a sensor.

It is yet an additional object to provide a method for using such a sensor.

A further object is to provide a method for manufacturing such a sensor.

These and other objects, features, and advantages of the invention are provided by the present invention, a pressure and temperature sensor that comprises a substantially hermetically sealed insulating package and an elastic, piezoelectric substrate deformably supported within the package along two lines substantially perpendicular to a long axis of the substrate. At least three surface-acoustic-wave resonators are affixed to a bottom of the substrate. The three resonators comprise a first and a second resonator, positioned in at least partially staggered, parallel relation along the substrate. The staggering is to permit each of the first and the second resonator to experience a different frequency shift upon the substrate's experiencing a deformation. The parallelism is for achieving a common reference point for the deformation.

A third resonator has a long axis nonparallel to the long axes of the first and the second resonator. The temperature coefficients of the first and second resonators are substantially equivalent; that of the third is different from those of the first and the second resonator. This difference is for permitting a temperature change to be sensed and transmitted.

The sensor further comprises at least two electrical connectors. Each resonator has two electrical contacts. One contact of each resonator is connected to the first or "hot" electrical connector, and the second contact of each resonator is connected to the second or ground connector; so the three resonators are electrically connected in parallel.

A sensing system comprises the sensor as described above and an antenna for receiving an electromagnetic signal from the three resonators.

A method of sensing pressure and temperature within a harsh environment comprises the steps of positioning a sensor such as described above within a harsh environment. An output electromagnetic signal is sent to the sensor from a location remote from the environment. The signal should have a frequency resonant with the at least three resonators and be receivable by the connector second ends. An input electromagnetic signal is received at the remote location from the sensor. The input signal is indicative of the pressure and the temperature within the environment.

A method of providing an internal tire pressure and temperature readout to a vehicle occupant comprises the steps of positioning a sensor such as described above within a vehicle tire. An input electromagnetic signal from the sensor is received at the vehicle that is indicative of the pressure and the temperature within the environment. The input signal is translated into a pressure and a temperature value, and a readout of the pressure and the temperature values are displayed within the vehicle.

A method of making a pressure and temperature sensor comprises the steps of providing an insulating package having a well therein and deformably supporting an elastic substrate within the package well. A first and a second surface-acoustic-wave resonator are affixed to a bottom of the substrate so as to have long axes parallel therebetween and to be in staggered relation along the substrate. Each of the first and the second resonators has substantially equivalent temperature coefficients.

A third surface-acoustic-wave resonator is affixed to the substrate bottom with a long axis nonparallel to the long axes of the first and the second resonator. The third resonator has a temperature coefficient different from the temperature coefficient of the first and the second resonators.

The first ends of a first, a second, and a third electrical connector are affixed in electrical contact with each of the respective first, second, and third resonators, with a second end extending out of the package.

Finally, the package is substantially hermetically sealed.

DETAILED DESCRIPTION OF THE PREFERRED EMBODIMENTS

A description of the preferred embodiments of the invention will now be presented with reference to FIGS. 1–4.

Figure 1:
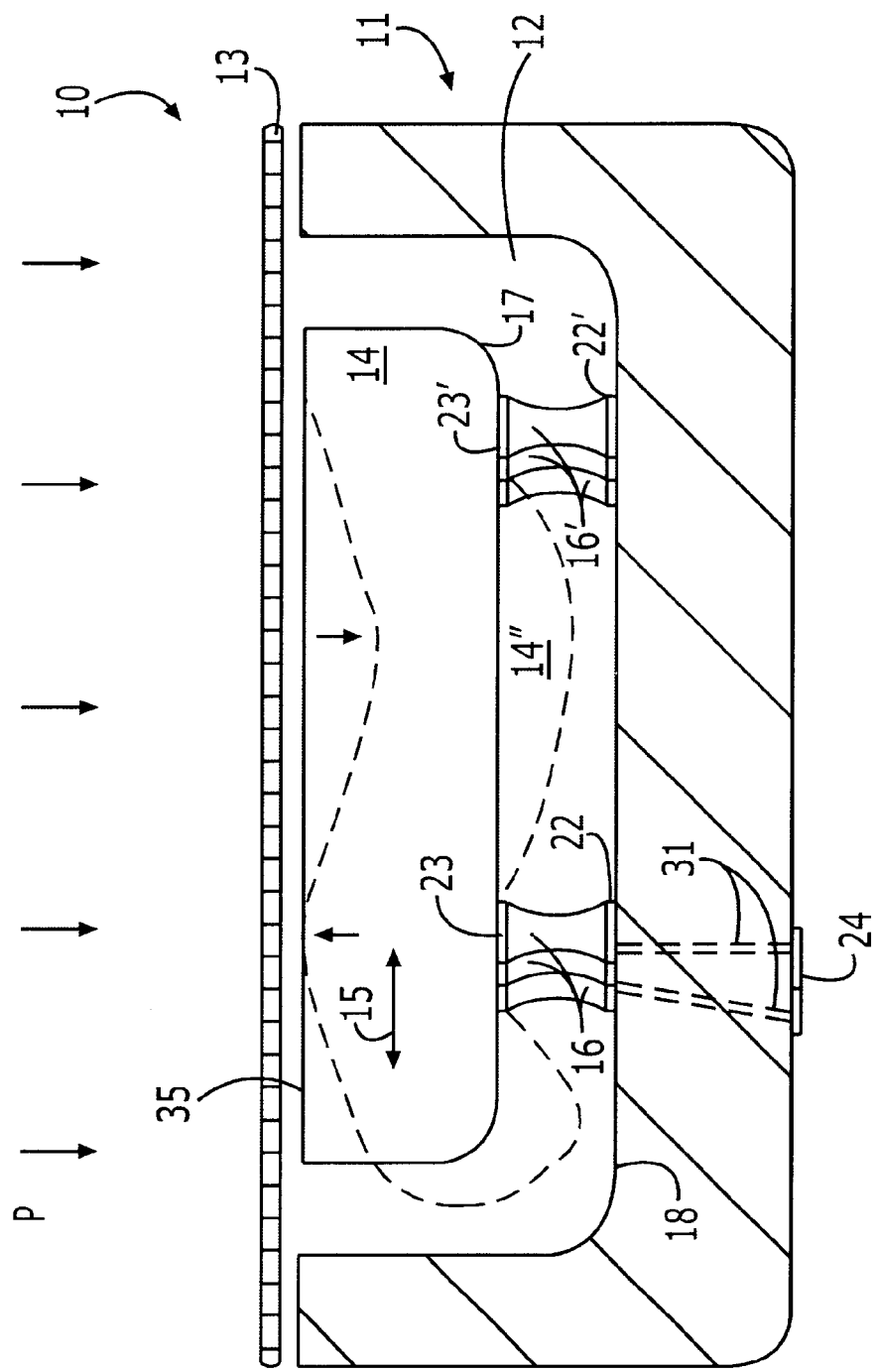
FIG. 1 is a side cross-sectional view of the sensor package and contents, illustrating a change to the substrate under increased pressure.

A first aspect of the present invention includes a pressure and temperature sensor 10, illustrated in FIG. 1, intended for use within the interior of a vehicle tire. The sensor 10 comprises a substantially hermetically sealed insulating package. In a preferred embodiment the package comprises a ceramic box 11 having a well 12 therein and a lid 13 sealingly affixed to the box 11 to cover the well 12. The box 11 may comprise, for example, a standard ceramic package such as is available for SAW devices for wireless communication products. These packages are small, rugged, inexpensive, and widely used.

The lid 13 comprises a thin, membranous metal cover, preferably steel or Kovar, although other materials can be used, having a thickness of approximately 2 mils, although these details are not intended to be limiting. The thickness of the lid 13 must be thin in order to transmit pressure changes to the sensor elements within the well 12. In a particular embodiment the lid 13 is soldered to the box 11, although alternative package sealing techniques, including seam welding, can also be used.

An elastic substrate 14 is deformably supported within the well 12, the substrate having a thickness substantially greater than the lid's thickness, in this particular embodiment approximately 14 mils. The substrate 14 comprises a substantially planar piezoelectric quartz crystalline material, or die.

The substrate 14 is supported by at least two discrete stands, and preferably two rows of discrete stands, positioned in supporting relation to the substrate 14. Preferably at least some of the stands comprise a gold stand 16, also known as a "bump bond," extending between the substrate's bottom 17 and a bottom 18 of the well 12. The gold stands 16 can also serve as electrical connectors. Other bump bonds 16' may provide only mechanical support and not electrical connection. The bump bonds 16' may be in contact with a region of the package that is not gold and thus may not attach firmly. In this case the bump bonds 16' act as spacers between the die 14 and the box 11.

Figure 2:
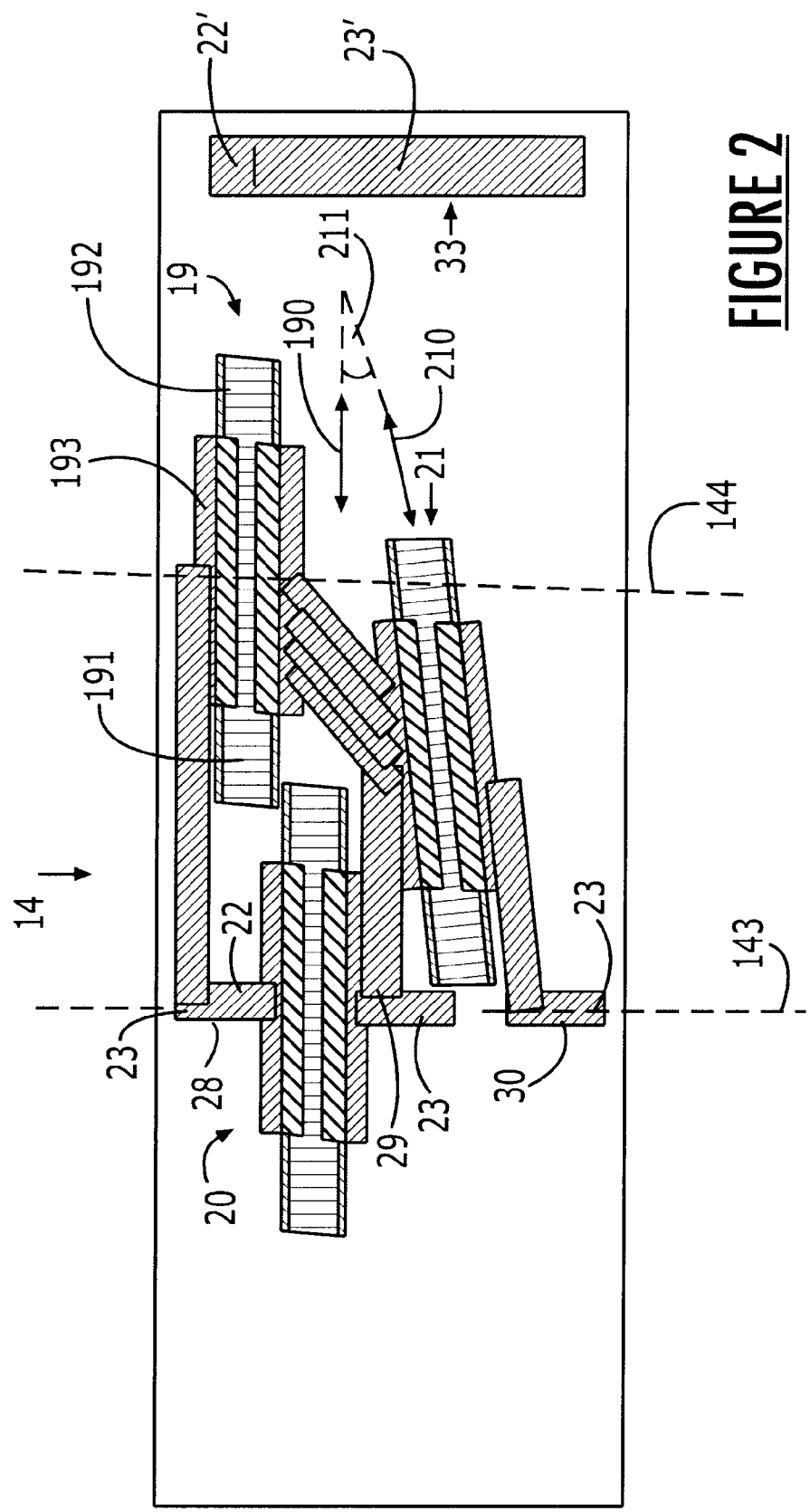
FIG. 2 is a bottom plan view of the substrate layout for the sensor of the present invention.

Three surface-acoustic-wave resonators 19–21 are affixed to the bottom 17 of the substrate 14, and are hence distinguishable from prior art devices in being fabricated on only one side of the substrate 14 (see FIG. 2). The resonators 19–21 comprise one-port resonators having slightly different nominal frequencies, and are oriented on the substrate 14 in a specific way to achieve some of the objects of this invention. Each resonator 19–21 comprises a pair of reflectors 191,192 and a transducer 193 positioned therebetween.

The first 19 and second 20 resonator have parallel long axes 190. They may be collinear, but preferably they are positioned in at least partially staggered relation along the substrate 14. The first 19 and the second 20 resonator are positioned relative to the strands 16 for opposite deformation under pressure change. In particular, the second resonator 20 straddles a line containing the first row of stands, and the first resonator 19 straddles a line midway between the two rows of stands.

These two resonators 19,20 experience substantially the same, very small, changes due to changes in temperature. Further, these resonators 19,20 have a substantially equivalent temperature coefficient.

Figure 3:
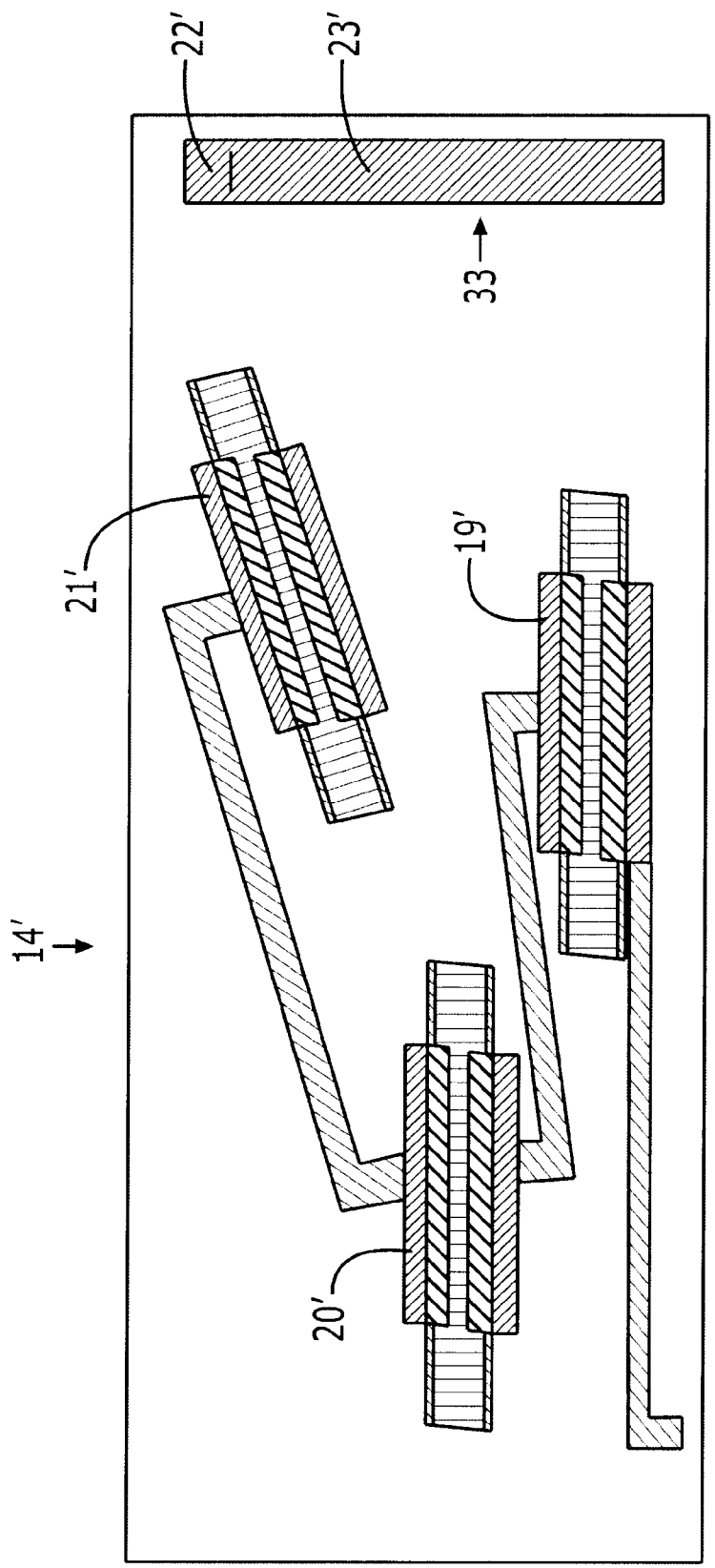
FIG. 3 is a bottom plan view of an alternate embodiment for the substrate layout.
Figure 4:
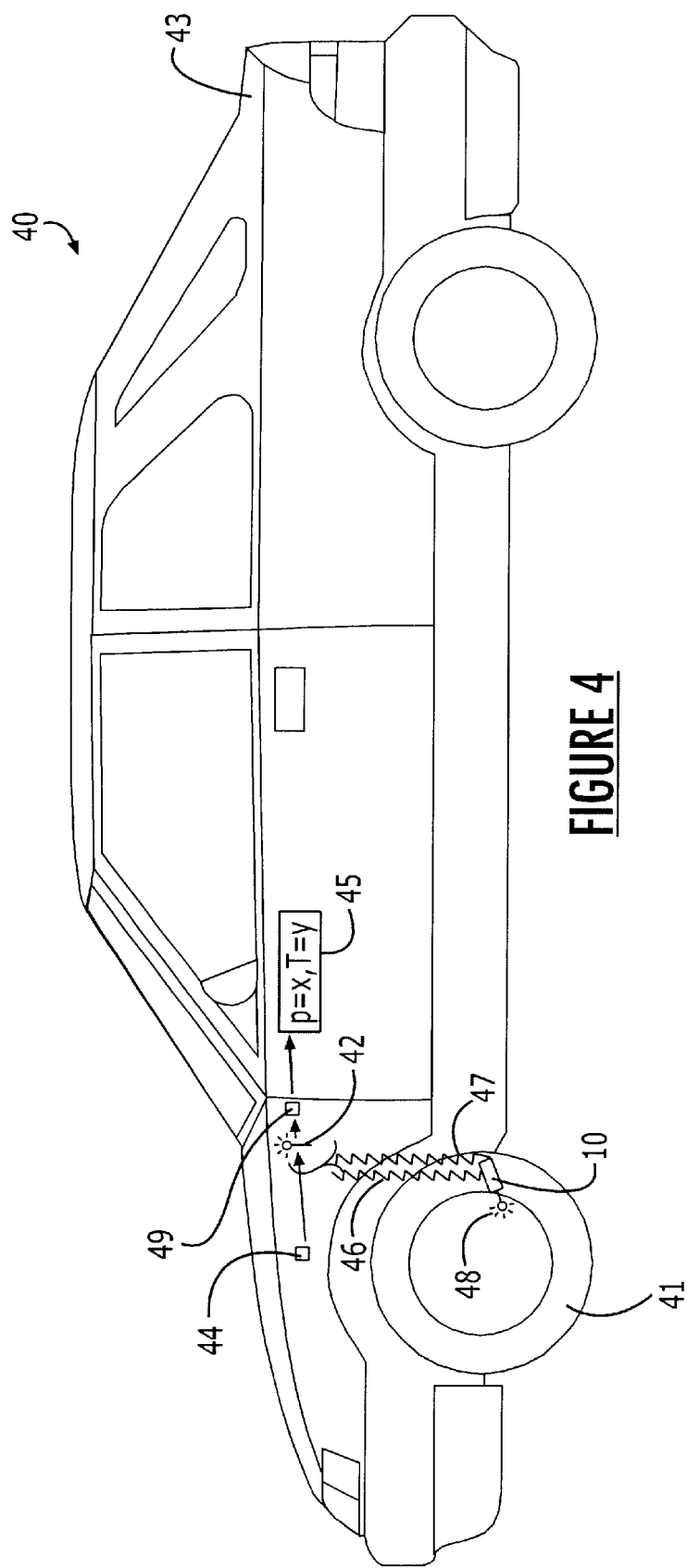
FIG. 4 is a schematic diagram of the sensor system of the present invention.

The third resonator 21 has its long axis 210 nonparallel to the long axes 190 of the other resonators 19,20 and a temperature coefficient different from their temperature coefficient. The third resonator 21 is positioned in laterally spaced relation from and longitudinally positioned so that the center of the third resonator 21 is between the two rows of stands and, in particular, approximately 25% of the spacing between rows from one, that is either, row and 75% of the spacing from the other row of stands. A preferred embodiment is shown in FIG. 2, wherein the third resonator 21 is positioned between the first 19 and the second 20 resonators. An alternate substrate layout is illustrated in FIG. 3, wherein the third resonator 21' is positioned between the first resonator 19' and the side edge of the substrate 14 farthest away from the second resonator 20'. In this layout the positions of the first 19' and the second 20' resonators are reversed, although none of the details of these layouts are intended as limitations, and one of skill in the art will recognize that alternate layouts do not depart from the spirit of the invention.

The resonators 19–21 are positioned relative to the mechanically supporting stands 16 such that when under pressure the die 14 is allowed to "sag" 144 in the region of one resonator 19, while the second resonator 20 is positioned with supporting stands 16 in the middle thereof so that it will bend in a complementary fashion (forming a "hump" 143 rather than a "sag"). These orientations are shown in FIG. 1, with the substrate moving from orientation 14 to a deformed orientation 14'. Thus when one resonator is under compression, the other will be under expansion, producing complementary velocity shifts and therefore complementary shifts in resonator frequency. The third resonator 21 is centered near an inflection point in an imposed curvature on the substrate 14, that is, between the "sag" and the "hump".

The fact that these resonators 19–21 respond (to first order) identically to temperature but differentially to pressure makes the difference between their frequencies a good measure of pressure exerted on the device relative to the reference pressure. The higher the pressure exerted (above the reference pressure), the more these frequencies will shift apart from one another, increasing the $\Delta f$ between the devices.

The third resonator 21 is positioned at an angle 211, here 6°, relative to the x axis of the wafer. Surface acoustic waves propagating in this direction have a small but nonzero temperature coefficient, allowing the measurement of temperature. Preferably, this resonator 21 is geometrically positioned on the overall die 14 in a way that minimizes the influence of pressure on the resonator's 21 frequency. Thus a measurement of the difference between the angled resonator's 21 frequency and the mean of the other two resonator's 19,20 frequencies, which does not vary with pressure, and varies predictably but only very slightly over temperature, provides a direct measurement of temperature.

While it is not possible to completely isolate the third resonator 21 from the effects of pressure, and thereby obtain a pure measurement of temperature, it is also not necessary to do this to obtain a temperature measurement. Since the three different resonators 19–21 each has its own distinct (different) respective center frequency, one can obtain from measurements of these frequencies three differential frequency measurements: $\Delta f_{21}$, $\Delta f_{31}$, and $\Delta f_{32}$.

Additional and potentially useful differential values can also be formed from the measured frequencies, such as the frequency of the third (angled) resonator 21 minus the mean of the other two resonator 19,20 frequencies. Since there are (to first order) only two physical parameters, pressure (P) and temperature (T), which influence these differential frequencies, one has more than enough information to form a set of equations to solve for these two unknowns exactly. Depending on the accuracy required by a given application, and on the geometry of the specific device, the temperature insensitivity of $\Delta f_{21}$ may make it a suitable measure for pressure directly. Similarly, for some applications the difference in frequency between the frequency of the angled resonator 21 and the mean of the frequencies of the other two resonators 19,20 is a sufficient measure of temperature.

Considering the orientation or mode in which the substrate 14 bends when pressure is exerted upon it, it is significant to note that the present sensor 10 utilizes one-dimensional supported beam bending of the die 14, rather than two-dimensional plate bending. One-dimensional supported beam bending is uniform in the transverse dimension and allows for the implementation of a device that deflects in a predictable, desired manner with a narrow transverse dimension, reducing the die size relative to devices utilizing plate-bending modes. Additionally, because the sides of the die 14 are unsupported, the maximum deflection of the one-dimensional bending motion caused by a given applied pressure will be greater that the maximum deflection would be for a plate of the same geometry supported on all four sides with the same applied pressure, allowing for an increase in sensitivity for a given die size.

The substrate 14 is mounted in what is called a "flip-chip" orientation, wherein the substrate 14 has electrically conductive bumps 16 placed on the resonator's bond pads 23 that require electrical connection. Not all bumps are needed for electrical connection; some bumps 16' are used solely for mechanical support reasons. The die is then "flipped" face down into the package, and an ultrasonic scrubbing motion is used to bond the bumps 16,16' to bond pads 22,22' on the other surface. The bumps 16,16' preferably comprise gold ball bumps, and the bond pads 23,23', 22,22' comprise various metals, typically gold on the package side and aluminum or a titanium- or copper-doped aluminum on the die 20 side. This mounting technique utilizes the bump bonds for mechanical attachment and support, and also utilizes certain of the bump bonds 22 to form the electrical connection between the substrate 14 and the package. The device 10 then has internal electrical connections between bond pads 23 inside the well 12 and additional bond pads 24 on the outside of the package 11, which can be attached to an antenna (FIG. 3) or other electrical circuit using a desired technique. This packaging technique is very rugged and easy to manufacture in high volume.

As in standard ceramic packaging fabrication techniques known in the art, the electrical connections to the die 14 pass from the interior to the exterior of the box 11 hermetically. In this preferred embodiment each lead 31 is co-formed with the package 11 and comprises a metal such as tungsten or gold, although these are not intended as limitations.

The device 10 further comprises a connector comprising a row of gold stands 32 insulated from the other connectors that extends between a pad 33 on the substrate's bottom 17 and the well bottom 18 and is positioned in additional supporting relation to the substrate 14.

In order to measure pressure in the completed device 10, some reference pressure is required on one side of the substrate 14. This is achieved in the present invention by hermetically sealing the device package 11 at a known pressure and in a desired atmosphere. This can be a vacuum, resulting in a device capable of measuring absolute pressure, or it can be some known pressure of a desired gas, such as, but not limited to, dry nitrogen.

A means for transmitting the external pressure to the substrate 14 within the hermetically sealed package 11,13 is now required in order for the device 10 to sense pressure properly. This transfer mechanism should not introduce losses; that is, it should be as direct and efficient as possible. In the present invention, the package 11,13 is designed so that, when the die 14 is attached within the package 11,13 using flip-chip bonding techniques, the backside of the substrate 14 is just slightly below the upper edges of the package 11 sides. The lid 13 is then placed on the top of the package 11. The lid is attached to the box 11 by a hermetic sealing process such as soldering or welding. Because the lid 13 is extremely thin, it is very flexible and does not significantly reduce the amount of bending of the substrate 14 (a thicker lid would make the bending structure effectively thicker, resulting in reduced pressure sensitivity).

An exemplary system 40 is for use in measuring pressure and temperature in the interior of a vehicle's tire 41 (FIG. 3). The system 40 comprises the sensor 10 attached to an antenna 46, which is positioned within at least one of the tires 41. Another antenna 42 positioned within the vehicle 43 for sending an output electromagnetic signal to and for receiving an input electromagnetic signal from the sensor antenna 46. The output signal 46 is generated by a signal generator 44 in the vehicle 43, with the output signal in a frequency range resonant with the three resonators 19–21.

A signal processor 44 also within the vehicle 43 translates the input electromagnetic signal 47 received by the antenna 42 into an internal tire pressure value and an internal tire temperature value. The processor 44 is in electrical communication with an occupant-accessible readout 45 for displaying the pressure value and the temperature value inside the tire 41 within the vehicle 43.

It is to be understood that even though numerous characteristics and advantages of the present invention have been set forth in the foregoing description, together with details of the structure and function of the invention, the disclosure is illustrative only, and changes may be made in detail, especially in the choice of type of SAW device, device orientation on the die, and shape size and arrangement of parts within the principles of the invention to the full extent indicated by the broad general meaning of the terms in which the appended claims are expressed.

What is claimed is:

1. A pressure and temperature sensor comprising:
a substantially hermetically sealed insulating package;
an elastic, piezoelectric substrate deformably supported within the package along two lines substantially perpendicular to a long axis of the substrate; and
at least three surface-acoustic-wave resonators affixed to a bottom of the substrate, the three resonators comprising:
a first and a second resonator, each having a long propagation axis parallel therebetween, positioned in at least partially staggered relation along the substrate for experiencing different deformations under strain, and each having a substantially equivalent temperature coefficient; and
a third resonator having a long propagation axis nonparallel to the long axes of the first and the second resonator and a temperature coefficient different from the temperature coefficient of the first and the second resonators.

2. The sensor recited in claim 1, wherein the substrate comprises a substantially planar quartz crystalline material.

3. The sensor recited in claim 1, wherein the package comprises a ceramic box having a well therein and a lid hermetically sealinged to the box to cover the well.

4. The sensor recited in claim 3, wherein the lid comprises a metal cover having a thickness substantially less than a thickness of the substrate.

5. The sensor recited in claim 1, wherein each resonator comprises a pair of reflectors and a transducer positioned therebetween.

6. The sensor recited in claim 1, wherein the long axes of the first and the second resonator are substantially parallel to a long axis of the substrate, the substrate long axis comprising a propagation direction of the substrate.

7. The sensor recited in claim 6, wherein the sensor further comprises a plurality of discrete stands positioned in supporting relation to the substrate along two rows, and the first and the second resonator are positioned relative to the rows of stands for opposite deformation under pressure change and the third resonator is positioned for adjacency to an inflection point under deformation of the substrate, for substantially canceling a deformation effect thereto under a pressure change.

8. The sensor recited in claim 7, wherein the first resonator is positioned approximately midway between the two rows of stands, the second resonator is positioned to straddle a first of the two rows of stands, and the third resonator is positioned in laterally spaced relation from and with a substantially equal amount of longitudinal overlap with the first and the second resonator.

9. The sensor recited in claim 7, wherein the first resonator is positioned in straddling relation to a first of the two rows of stands, the second resonator is positioned approximately midway between the two rows of stands, and the third resonator is positioned between the second resonator and a second of the two rows of stands.

10. The sensor recited in claim 1, wherein the package comprises a ceramic box having a well therein and further comprising at least two leads extending between the resonators and an exterior of the box, each lead co-formed with the ceramic.

11. The sensor recited in claim 10, wherein the lead comprises a metal selected from a group consisting of tungsten and gold.

12. A sensor comprising:
   a hermetically sealed insulating package;
   an elastically deformable piezoelectric substrate supported within the package;
   at least two SAW sensing elements operable with the piezoelectric substrate, each element having at least one of a transducer and a reflector carried thereon;
   a plurality of discrete stands positioned in supporting relation to the substrate along two rows, wherein the at least two SAW sensing elements are positioned relative to the two rows of the plurality of discrete stands for effecting an opposite deformation of each of the at least two SAW sensing elements under a pressure change, the at least two SAW sensing elements operable with the substrate for providing a pressure measurement; and
   a third SAW sensing element positioned proximate an inflexion portion of the substrate, the third SAW sensing element having a propagation axis nonparallel to a propagation axis of the at least two SAW sensing elements, the third SAW sensing element operable with the substrate for providing a temperature measurement.

13. The sensor recited in claim 12, wherein one sensing element of the at least two SAW sensing elements is positioned approximately midway between the two rows of discrete strands, and wherein a second sensing element of the at least two SAW sensing elements is positioned to straddle a first of the two rows of discrete strands.

14. The sensor recited in claim 12, wherein an acute angle is formed between the propagation axis of the third SAW sensing element and the propagation axes of the at least two SAW sensing elements sufficient for providing a nonzero temperature coefficient for the sensor and thus the temperature measurement therefrom.

15. The sensor recited in claim 12, wherein the plurality of discrete stands comprises a row of gold bumps.

16. The sensor recited in claim 12, wherein at least two of the plurality of discrete stands provides an electrical connection.

* * * * *